(12) United States Patent
Joo et al.

(10) Patent No.: US 12,297,112 B2
(45) Date of Patent: May 13, 2025

(54) GRAPHENE AND GRAPHENE DERIVATIVES AS SUBSTRATE COATINGS

(71) Applicants: DENSO International America, Inc., Southfield, MI (US); Center for Technology Licensing Cornell University, Ithaca, NY (US)

(72) Inventors: Yong Lak Joo, Ithaca, NY (US); Naman Gupta, Ithaca, NY (US); Somayeh Zamani, Ithaca, NY (US); Yash Joshi, Ithaca, NY (US); Ryota Okumura, Southfield, MI (US); Shinichi Ito, Southfield, MI (US); Elizabeth Izor, Southfield, MI (US)

(73) Assignees: DENSO International America, Inc., Southfield, MI (US); Center for Technology Licensing Cornell University, Ithaca, NY (US)

( * ) Notice: Subject to any disclaimer, the term of this patent is extended or adjusted under 35 U.S.C. 154(b) by 873 days.

(21) Appl. No.: 17/471,678

(22) Filed: Sep. 10, 2021

(65) Prior Publication Data

US 2023/0082231 A1   Mar. 16, 2023

(51) Int. Cl.
*C01B 9/00* (2006.01)
*B05D 1/04* (2006.01)
*C01B 32/19* (2017.01)

(52) U.S. Cl.
CPC ............ *C01B 32/19* (2017.08); *B05D 1/04* (2013.01); *C01B 2204/04* (2013.01); *C01B 2204/22* (2013.01); *C01P 2002/82* (2013.01); *C01P 2004/03* (2013.01)

(58) Field of Classification Search
CPC ....... Y10T 428/30; B82Y 30/00; B82Y 40/00; C01B 32/19; C01B 2204/04; C01B 2204/22
USPC ......................................................... 428/408
See application file for complete search history.

(56) References Cited

FOREIGN PATENT DOCUMENTS

| CN | 106477559 | * | 3/2017 |
| JP | 2016108214 | * | 6/2016 |

OTHER PUBLICATIONS

Graphene Epoxy-Based Composites as Efficient Electromagnetic Absorbers in the Extremely High-Frequency Band; Zahra Barani ACS Appl. Mater. Interface 2020, 12, 28635-28644.*

* cited by examiner

*Primary Examiner* — Daniel H Miller
(74) *Attorney, Agent, or Firm* — Dickinson Wright PLLC

(57) ABSTRACT

A coating layer for a substrate includes a coating material. The coating material includes graphene and/or graphene derivatives that reflect and/or absorb an electromagnetic (EM) wave having a frequency of above 20 GHz. The coating layer is deposited on a surface of the substrate.

20 Claims, 9 Drawing Sheets

GRAPHENE AND GRAPHENE DERIVATIVES AS SUBSTRATE COATINGS

TECHNICAL FIELD

The present disclosure relates to graphene and graphene derivatives as substrate coatings, for example, graphene and graphene derivatives as coatings for resins, metals, ceramics, silicone substrates, or hybrids thereof to reflect and/or absorb electromagnetic waves from electronic devices and to promote heat dissipation of the electronic devices.

BACKGROUND

Graphene and graphene-metal hybrids are promising candidate materials for the next generation of energy applications due to their remarkable properties. They have been intensively investigated as active materials for many industrial applications. For example, graphene has been used to improve touch screens for electronics, such as phones or tablets. Graphene has also been used to make the circuitry for computers. Additionally, graphene has been used to develop light-weight batteries and capacitors.

SUMMARY

According to one embodiment, a coating layer for a substrate is disclosed. The coating layer may include a coating material having graphene and/or graphene derivatives that reflect and/or absorb an electromagnetic (EM) wave having a frequency of above 20 GHz, where the coating layer is deposited on a surface of the substrate.

According to another embodiment, an electronic device is disclosed. The electronic device may include an electronic component emitting an electromagnetic (EM) wave with a frequency of above 20 GHz. The electronic device may further include a metal substrate electrically coupled to the electronic device and covering the electronic component. The electronic device may also include a spacer having a spacer material attached to the metal substrate. The electronic device may further include a coating layer having a coating material deposited on a surface of the spacer, where the surface faces away from the metal substrate, and the coating material is graphene and/or graphene derivatives that reflect and/or absorb the EM wave emitted by the electronic component.

According to yet another embodiment, a method of preparing graphene and/or graphene derivatives as a coating material for a substrate is disclosed. The method may include suspending graphite flakes in deionized water to give a first reaction mixture and stirring the first reaction mixture. The method may further include adding a stabilizer to the first reaction mixture to give a second reaction mixture and stirring the second reaction mixture. The method may also include adding a dispersant to the second reaction mixture to give a third reaction mixture and stirring the third reaction mixture. The method may further include adding the third reaction mixture to a Taylor-Couette reactor (TCR) for reaction which gives a fourth reaction mixture, where the TCR has a stationary inner cylinder and a rotary outer cylinder. The method may also include centrifuging the fourth reaction mixture. The method may further include collecting centrifugate from the fourth reaction mixture which contains exfoliated graphene.

DETAILED DESCRIPTION

Figure 1A:
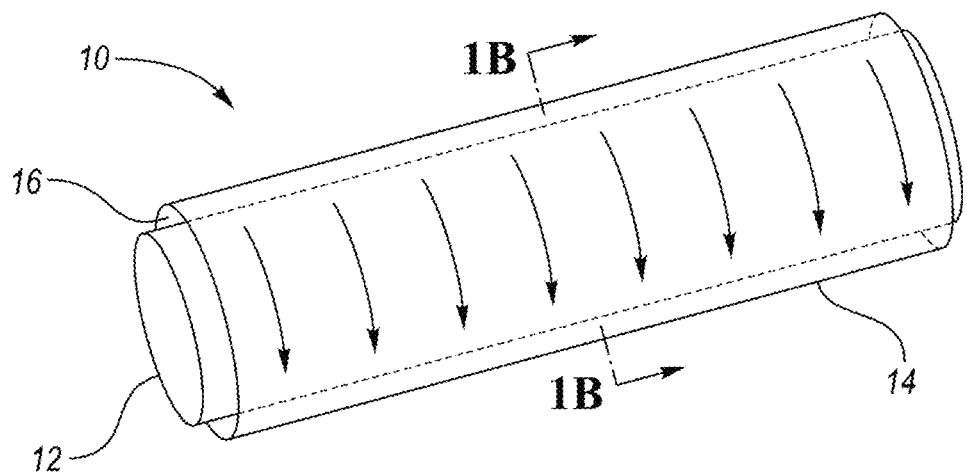
FIG. 1A depicts a schematic diagram showing a perspective side view of a Taylor-Couette reactor (TCR).

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Graphene is found in nature generally in the form of graphite. Graphene is about 200 times stronger than steel by weight, yet about 1,000 times lighter than paper. Graphene is also the thinnest material known to exist; for example, graphene is about 1 million times thinner than a human hair. Graphene is also considered to be the world's most conductive material of both electricity and heat. In addition to being stretchable, graphene is transparent, flexible and impermeable.

Graphene is a two-dimensional crystalline carbon material, existing as a single layer of carbon atoms that are bonded in a hexagonal lattice (e.g. a honeycomb lattice). It is a basic constructional material for other carbon allotropes. For example, graphene may be wrapped up into zero-dimensional fullerenes, rolled into one-dimensional carbon nanotubes, or stacked into three-dimensional graphite. Methods to prepare graphene can be generally categorized into a bottom-up method and a top-down method. The bottom-up method may synthesize graphene through epitaxial growth or chemical vapor deposition, and the top-down method may produce graphene by reduction of graphene oxide that is synthesized from oxidizing graphite.

Aspects of the present disclosure are directed to graphene and graphene derivatives as substrate coatings, for example, graphene and graphene derivatives as coatings for resins, metals, ceramics, silicone substrates, or hybrids thereof to reflect and/or absorb electromagnetic waves from electronic devices and to promote heat dissipation of the electronic devices. In one embodiment, the present disclosure relates to a coating layer for a substrate that includes graphene and/or graphene derivatives to reflect and/or absorb EM waves from electronic device and to promote heat dissipation of the electronic device. In another embodiment, the present disclosure relates to an electronic device that includes a coating layer having graphene and/or graphene derivatives to reflect and/or absorb EM waves from the electronic device and to promote heat dissipation of the electronic device. In yet another embodiment, the present disclosure relates to a method of preparing graphene and/or graphene derivatives using a Taylor-Couette reactor (TCR) and depositing the graphene and/or graphene derivatives onto a substrate using air-controlled electrospray (ACES).

Electronic devices that carry rapidly changing electrical currents can emit electromagnetic conduction or radiation (e.g. EM waves). These electronic devices may be portable devices such as cellphones. The emitted electromagnetic conduction or radiation is generally referred to as electromagnetic interference (EMI). EMI can disturb a normal function of an affected electrical circuit, thereby degrading or limiting the performance of the electrical circuit. In extreme scenarios, EMI can destroy the electrical circuit.

To diminish the effect of EMI, a metal substrate, such as a shield, may be used to cover an EMI source. The EMI source may be an electronic device or a component thereof that generates EMI. On one hand, the metal substrate may absorb electromagnetic conduction or radiation generated by the EMI source from affecting other devices (e.g. electrical circuits or the like). On the other hand, the metal substrate may protect the covered electronic device or a component thereof from electromagnetic conduction or radiation emitted by other devices. The metal substrate is generally made of an electrically conductive material, which may be a metal sheet or metal screen. The metal substrate may be electrically coupled (e.g. soldered or the like) to the electronic device or the component thereof. To enhance EMI shielding, a coating layer may be formed on the metal substrate. In some embodiments, the coating layer may be formed on a substrate which is attached to the metal substrate. The substrate may be, but not limited to, resins, metals, ceramics, silicone substrates, or hybrids thereof. The coating layer may include a coating material that may not only reflect and/or absorb EM waves but also conduct heat.

Figure 1B:
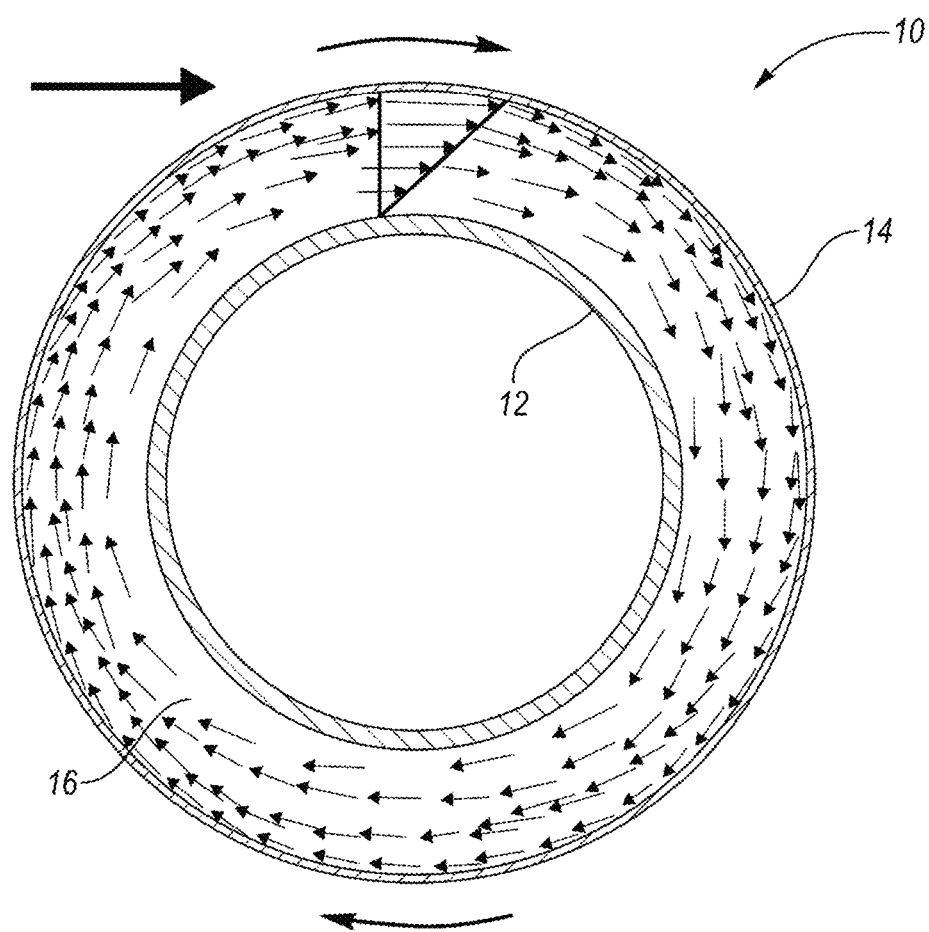
FIG. 1B depicts a schematic diagram showing a perspective cross-sectional view of the TCR shown in FIG. 1A.

FIG. 1A depicts a schematic diagram showing a perspective side view of a Taylor-Couette reactor (TCR) 10. The TCR 10 may be used to prepare graphene and/or graphene derivatives. FIG. 1B depicts a schematic diagram showing a perspective cross-sectional view of the TCR 10 shown in FIG. 1A. As shown in FIGS. 1A and 1B, the TCR 10 includes two coaxial cylinders, an inner cylinder 12 and an outer cylinder 14. The two coaxial cylinders define a gap 16 there between. In some embodiments, the inner cylinder 12 may rotate while the outer cylinder 14 is stationary, creating toroidal vortices (or Taylor vortices) for efficient radial mixing of a reaction medium injected into the TCR 10. In some other embodiments, the outer cylinder 14 may rotate while the inner cylinder 12 is stationary. The rotation of the outer cylinder 14 may induce high wall shear stress via high shear rate, for example, about 5,300 $s^{-1}$. The inner cylinder 12 may have a diameter in a range of 1.94 to 1.99 inches. The outer cylinder 14 may have a diameter of 2.00 inches.

The TCR 10 may be used to synthesize graphene and graphene derivatives. The TCR 10 offers an easily-scalable and environmentally-friendly system for the synthesis of graphene and graphene derivatives from aqueous solution of graphite suspension. Using the TCR 10, graphene sheets may be produced with large lateral dimensions. In some embodiments, the lateral dimension of the synthesized graphene sheets may be over 10 meters. The synthesized graphene and/or graphene derivatives may be applied onto a substrate (e.g. a metal substrate) to form a coating layer thereon.

Figure 2:
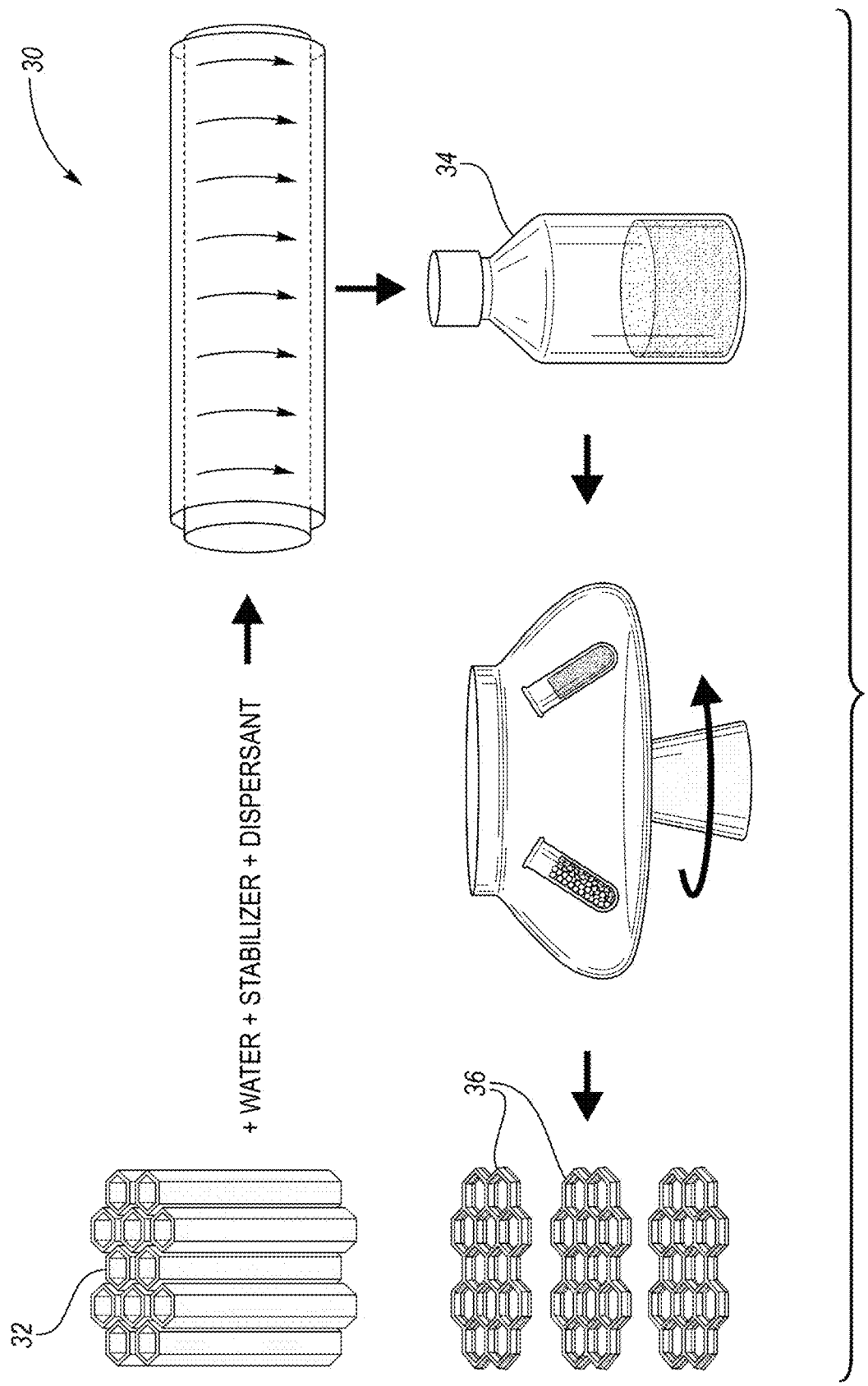
FIG. 2 depicts a schematic diagram showing a method of preparing graphene and/or graphene derivatives using the TCR illustrated in FIGS. 1A and 1B according to a first embodiment of the present disclosure.

FIG. 2 depicts a schematic diagram showing a method 30 of preparing graphene and/or graphene derivatives using the TCR 10 illustrated in FIGS. 1A and 1B according to a first embodiment of the present disclosure. Expandable graphite is an essential precursor for the production of exfoliated graphite, which consists of stacked, flexible graphene sheets capable of expanding upon heating. To prepare graphene and/or graphene derivatives, natural graphite flakes 32 may be suspended in deionized water (DI), giving a first reaction mixture. In some embodiments, the natural graphite flakes 32 may be natural graphite powders (Gr 3061, 180-425 mesh). In some other embodiments, the natural graphite flakes 32 may be natural graphite dispersion (Graphokote 722). After stirring the first reaction mixture, a stabilizer may be added to the first reaction mixture, giving a second reaction mixture. The stabilizer may be xanthan gum. After stirring the second reaction mixture, a dispersant may be added to the second reaction mixture, giving a third reaction mixture. The dispersant may be Pluronic F127. In some embodiments, a binder may further be added to the third reaction mixture to improve adhesion. The binder may be, but not limited to, polyacrylic acid (PAA), polyvinyl alcohol (PVA) or polyvinylpyrrolidone (PVP).

Continuing referring to FIG. 2, the third reaction mixture may then be injected into the gap 16 between the two coaxial cylinders of the TCR 10. The outer cylinder 14 of the TCR 10 may rotate while the inner cylinder 12 remains stationary. The rotation of the outer cylinder 14 creates high wall shear stress via high shear rate, which facilitates the penetration of the dispersant into the interlayer spacing of the graphene sheets. After reaction, a fourth reaction mixture 34 may be obtained from the TCR 10. Any under-expanded natural graphite flakes may suspend in the fourth reaction mixture 34. The fourth reaction mixture 34 may then be centrifuged, after which the under-expanded natural graphite flakes may precipitate. The resulting centrifugate may be collected, which contains the graphene and/or graphene derivatives 36.

In one embodiment, to prepare graphene and/or graphene derivatives using the TCR 10, 15 grams (g) of natural graphite flakes are suspended in 50 milliliter (mL) DI water. The reaction mixture is stirred for 10 minutes. Next, 0.13 g of xanthan gum is added to the reaction mixture, and the resulting reaction mixture continues to stir for another 10 minutes. Thereafter, 0.15 g of Pluronic F127 is added to the reaction mixture. Additionally, a binder, such as PAA, PVA or PVP, may be added to the reaction mixture. The resulting reaction mixture continues to stir for another 10 minutes, followed by stirring for 20 hours. After stirring, the reaction mixture is injected into the gap between the two coaxial cylinders of the TCR. The outer cylinder of the TCR rotates at a speed of 1500 rpm while the inner cylinder is stationary. The rotation of the outer cylinder may induce a high shear rate of about 5,300 $s^{-1}$. The shearing time in the TCR is 3 hours. After reaction, the color of the reaction mixture may be dark grey, and any under-expanded natural graphite may suspend in the reaction mixture. The reaction mixture is then centrifuged at a speed of 3300 rpm for 30 minutes, after which the under-expanded natural graphite may precipitate. The resulting centrifugate is collected, which contains the graphene and/or its derivatives.

Figure 3:
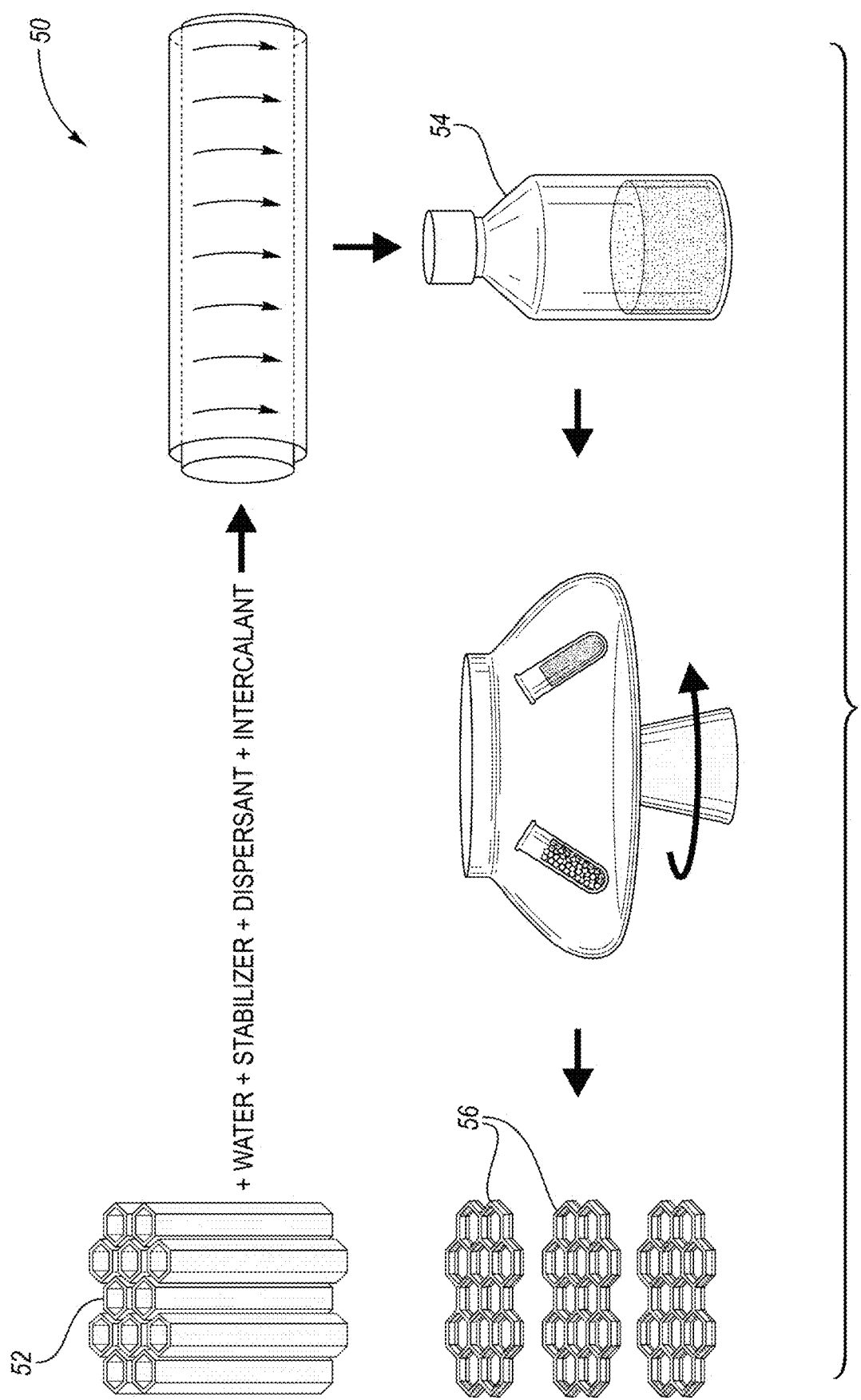
FIG. 3 depicts a schematic diagram showing a method of preparing graphene and/or graphene derivatives using the TCR illustrated in FIGS. 1A and 1B according to a second embodiment of the present disclosure.

FIG. 3 depicts a schematic diagram showing a method 50 of preparing graphene and/or graphene derivatives using the TCR 10 illustrated in FIGS. 1A and 1B according to a second embodiment of the present disclosure. Expandable graphite is an essential precursor for the production of exfoliated graphite, which consists of stacked, flexible graphene sheets capable of expanding upon heating. An intercalant material may be introduced in the preparation of the graphene and/or graphene derivatives. The intercalant material may be inserted between the graphene sheets. In some embodiments, the intercalant material may be a metal or metal precursor element, including, but not limited to, nickel (Ni), iron (Fe), or copper (Cu).

Referring to FIG. 3, to prepare graphene and/or graphene derivatives, natural graphite flakes 52 may be suspended in deionized water (DI), giving a first reaction mixture. In some embodiments, the natural graphite flakes 52 may be natural graphite powders (Gr 3061, 180-425 mesh). In some other embodiments, the natural graphite flakes 52 may be natural graphite dispersion (Graphokote 722). After stirring the first reaction mixture, a stabilizer may be added to the first reaction mixture, giving a second reaction mixture. The stabilizer may be xanthan gum. After stirring the second reaction mixture, a dispersant may be added to the second reaction mixture, giving a third reaction mixture. The dispersant may be Pluronic F127. After stirring the third reaction mixture, an intercalant material may be added to the third reaction mixture, giving a fourth reaction mixture. The intercalant material may be a metal or metal precursor element, including, but not limited to, Ni, Fe, or Cu. In some embodiments, a binder may further be added to the fourth reaction mixture to improve adhesion. The binder may be, but not limited to, PAA, PVA or PVP.

Continuing referring to FIG. 3, the fourth reaction mixture may then be injected into the gap 16 between the two coaxial cylinders of the TCR 10. The outer cylinder 14 of the TCR 10 may rotate while the inner cylinder 12 remains stationary. The rotation of the outer cylinder 14 creates high wall shear stress via high shear rate, which facilitates the penetration of the dispersant into the interlayer spacing of the graphene sheets. After reaction, a fifth reaction mixture 54 may be obtained. Any under-expanded natural graphite flakes may suspend in the fifth reaction mixture 54. The fifth reaction mixture 54 may then be centrifuged, after which the under-expanded natural graphite flakes may precipitate. The resulting centrifugate may be collected, which contains the graphene and/or graphene derivatives 56.

Figure 4:
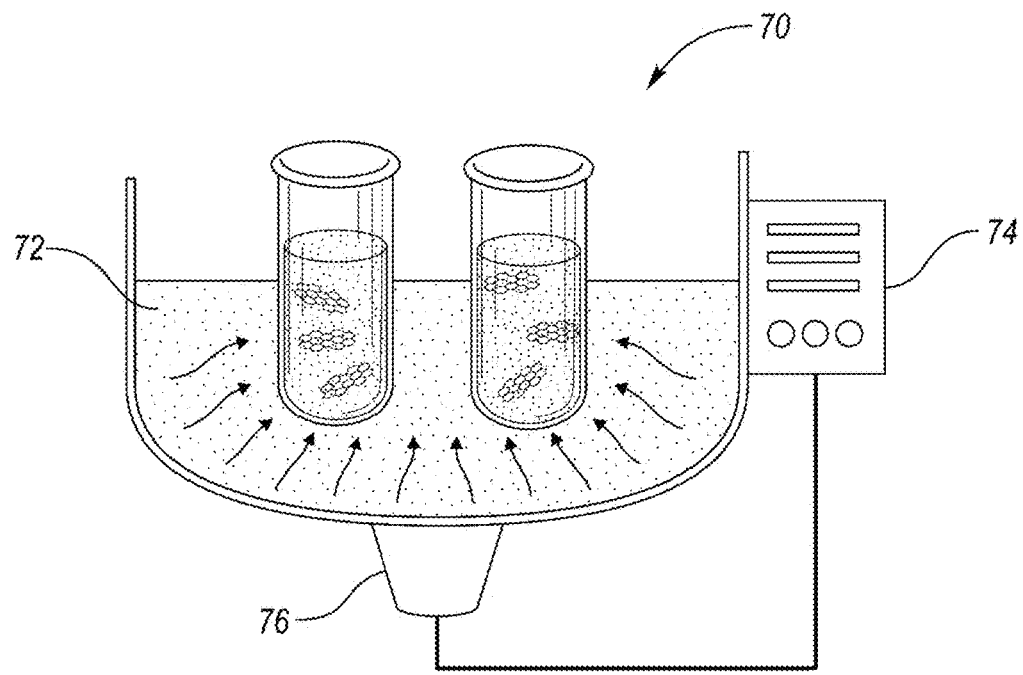
FIG. 4 depicts a schematic diagram of a someation process of graphene and/or graphene derivatives.

FIG. 4 depicts a schematic diagram of a someation process 70 of graphene and/or graphene derivatives. The graphene and/or graphene derivatives may be prepared using the method illustrated in FIG. 2 or 3. The graphene and/or graphene derivatives may be graphene Gr 3061 or Gr 722. The someation process 70 may be performed before depositing the graphene and/or graphene derivatives as a coating material onto a substrate (e.g. a metal substrate). As shown in FIG. 4, the graphene and/or graphene derivatives may be disposed in an ultrasome bath 72. The ultrasome bath 72 may include water with a temperature of about 25° C. An ultrasound energy, indicated by the arrows, may be generated by an ultrasound generator 74 and provided to an ultrasound transducer 76 attached to the ultrasome bath 72.

Figure 5:
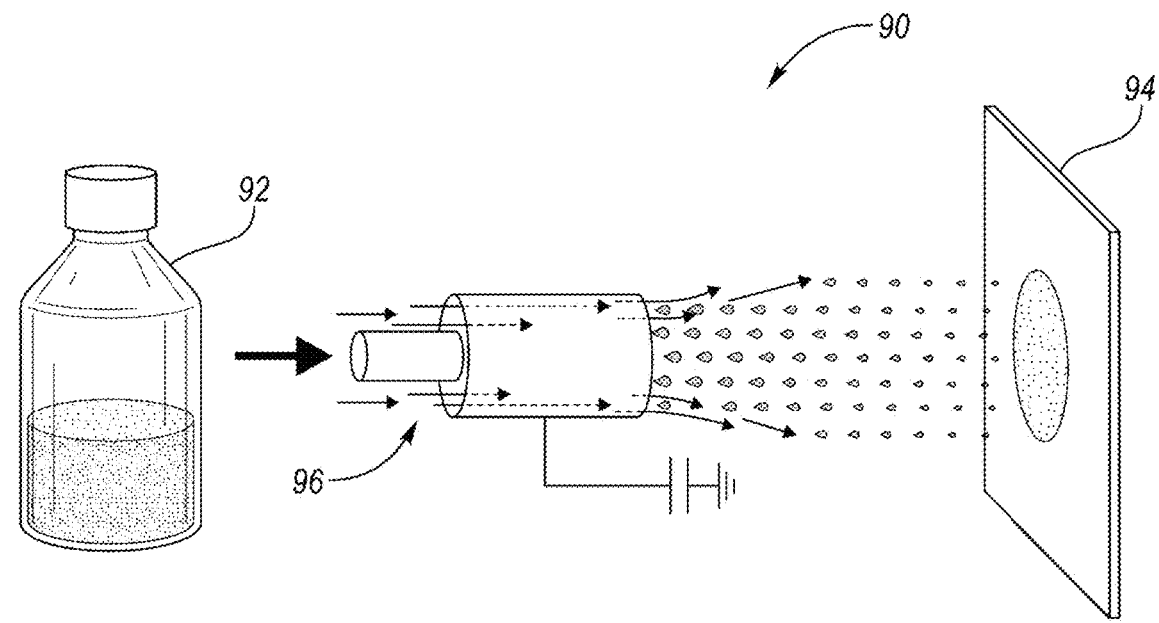
FIG. 5 depicts a schematic diagram of a deposition process of graphene and/or graphene derivatives as a coating material onto a substrate.

FIG. 5 depicts a schematic diagram of a deposition process 90 of graphene and/or graphene derivatives 92 as a coating material onto a substrate 94. The substrate 94 may be a resin, a metal, a ceramic, a silicon substrate, or a hybrid thereof. The graphene and/or graphene derivatives 92 may be prepared using the method illustrated in FIG. 2 or 3. The graphene and/or graphene derivatives may be graphene Gr 3061 or Gr 722. In some embodiments, the substrate 94 may be a resin, including, but not limited to, polypropene (PP), polybutylene terephthalate (PBT), polyphenylene sulfide (PBS), acrylonitrile butadiene styrene (ABS), polyamindes (PA), or its composite. The composite of the resin may be reinforced with glass fiber or other resin filler materials. The resin filler materials may be, but not limited to, talcum powder (talc). In some other embodiments, the substrate 94 may be a silicon wafer. In yet some other embodiments, the substrate 94 may be a Cu substrate. A thickness of the graphene and/or graphene derivatives 92 deposited onto the substrate 94 may be in a range of 0.1 to 200 μm.

To deposit graphene and/or graphene derivatives 92 as a coating material onto the substrate 94, air-controlled electrospray (ACES) 96 may be used. ACES 96 employs a high-speed, circumferentially uniform airflow, providing enhanced break-up and deformation of solution drops. ACES 96 offers a high production rate, a good control of dispersion of nano-inclusions in the solution drops, smaller drop sizes, and a good control of directing solution drops towards the substrate with a more uniform and thin coating.

Referring to FIG. 5, ACES 96 may be operated under ambient conditions using, for example, a Harvard Apparatus PHD 2000 Infusion syringe pump with a coaxial needle set. The coaxial needle set may include an inner 17 G needle and an outer 12 G needle. A solution containing the graphene and/or graphene derivatives 92 may be supplied through the inner 17 gauge (G) needle, and air, indicated by the arrows, is supplied through the outer 12 G needle. A working voltage may be set at 25 kV. A working distance may be set at 15 cm. A feeding rate of the solution may be set at 0.03 mL $min^{-1}$. The air pressure may be set at 20 psi.

Figure 6A:
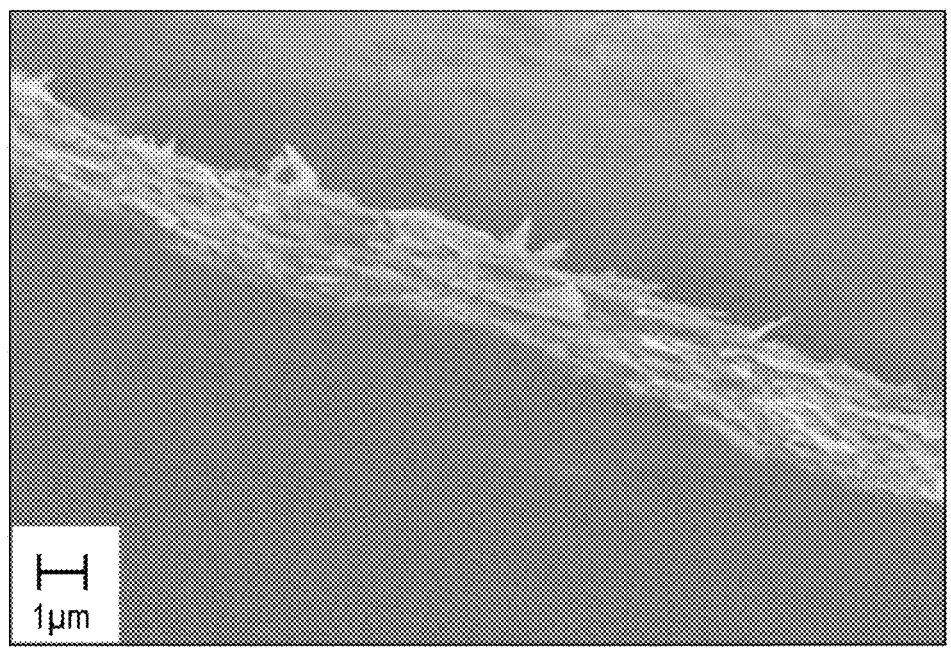
FIG. 6A depicts a scanning electron microscope (SEM) image of a cross section of exfoliated graphene from graphite (Gr 3061).

FIG. 6A depicts a scanning electron microscope (SEM) image of a cross section of exfoliated graphene from graphite (Gr 3061). The Gr 3061 may be prepared using the method illustrated in FIG. 2 or 3. FIG. 6A shows a stacked morphology of the synthesized Gr 3061. An electrical conductivity of the synthesized Gr 3061 may be measured using a Cascade Four-Point Probe. The Cascade Four-Point Probe includes four probe points, i.e. two outside points and two inside points. The Cascade Four-Point Probe can be used to measure the resistance of a thin layer or sheet by passing current through the two outside points of the Probe and measuring the voltage across the two inside points of the Probe. The electrical conductivity of the synthesized Gr 3061 measured by the Cascade Four-Point Probe is about 0.1506 S/m.

Figure 6B:
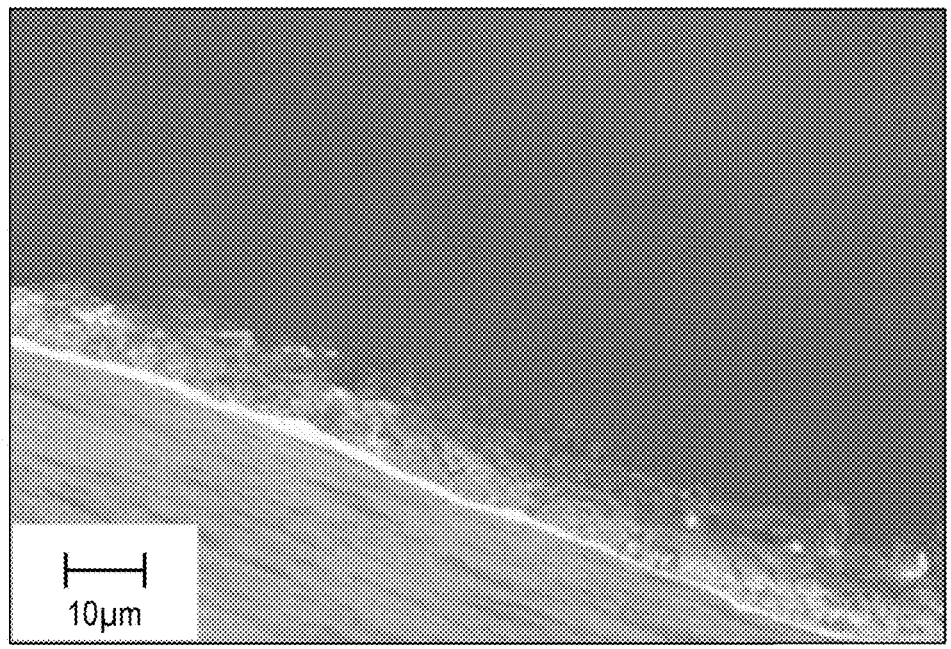
FIG. 6B depicts a SEM image of a cross section of exfoliated graphene from graphite (Gr 722).

FIG. 6B depicts a SEM image of a cross section of exfoliated graphene from graphite (Gr 722). The Gr 722 may be prepared using the method illustrated in FIG. 2 or 3. Comparing with the SEM image of graphene from Gr 3061 shown in FIG. 6A, FIG. 6B shows that the exfoliated graphene from Gr 722 exhibits a denser and more compact morphology. An electrical conductivity of the exfoliated graphene from Gr 722 measured by the Cascade Four-Point Probe is about 3385.2 S/m, which is much higher than that of the exfoliated graphene from Gr 3061.

Figure 7A:
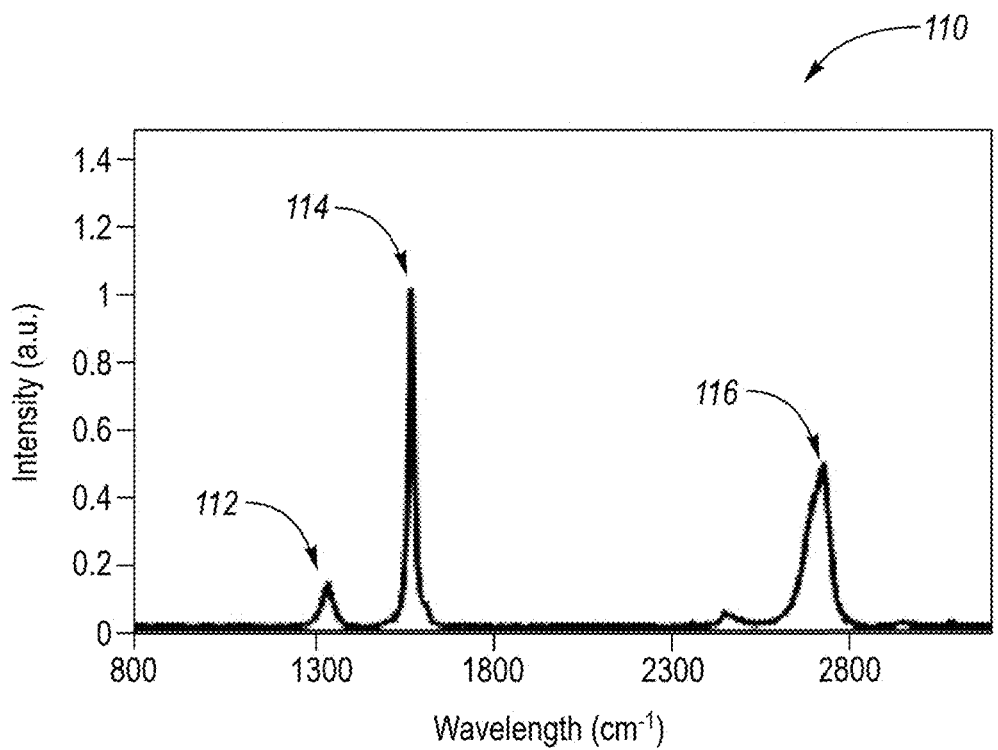
FIG. 7A depicts a Raman spectroscopy ($E_{laser}$=532 nm) of the exfoliated graphene from graphite (Gr 3061) as described in FIG. 6A.

FIG. 7A depicts a Raman spectroscopy ($E_{laser}$=532 nm) 110 of the exfoliated graphene from graphite (Gr 3061) as described in FIG. 6A. The Raman spectroscopy 110 may be used to investigate structural defects on the synthesized graphene Gr 3061. An energy shift caused by laser excitation may create main Raman peak positions. For example, a D band 112 is typically shown at or around 1350 cm$^{-1}$; a G band 114 is typically shown at or around 1570 cm$^{-1}$; and a 2D band 116 is typically shown at or around 2700 cm$^{-1}$. The D band 112 is a defect-activated peak that corresponds to sp$^3$-defects or vacancy-type defects. The G band 114 may shift to a higher wavelength (1600 cm$^{-1}$) in the presence of oxygenated functional groups on the graphene structure. Referring to FIG. 7A, the Raman spectroscopy 110 appears to indicate that no oxygenated functional groups exists in the synthesized Gr 3061, and that all defect-activated peaks may correspond to vacancy-type defects. The 2D band 116 may increase its intensity and broaden its shape with increasing exfoliation levels. Exposing natural graphite flakes to the strong Couette fluid flow created by the TCR results in structural changes in the graphite lattice, yielding a higher intensity of the D band 112. A ratio of the band intensity (I) of the D band to the G band, i.e. $I_{(D)}/I_{(G)}$, may be used to determine a defect level in a synthesized graphene. The $I_{(D)}/I_{(G)}$ ratio may increase as the reaction mixture is exposed to the high shear rate at extended shearing times in the TCR.

Figure 7B:
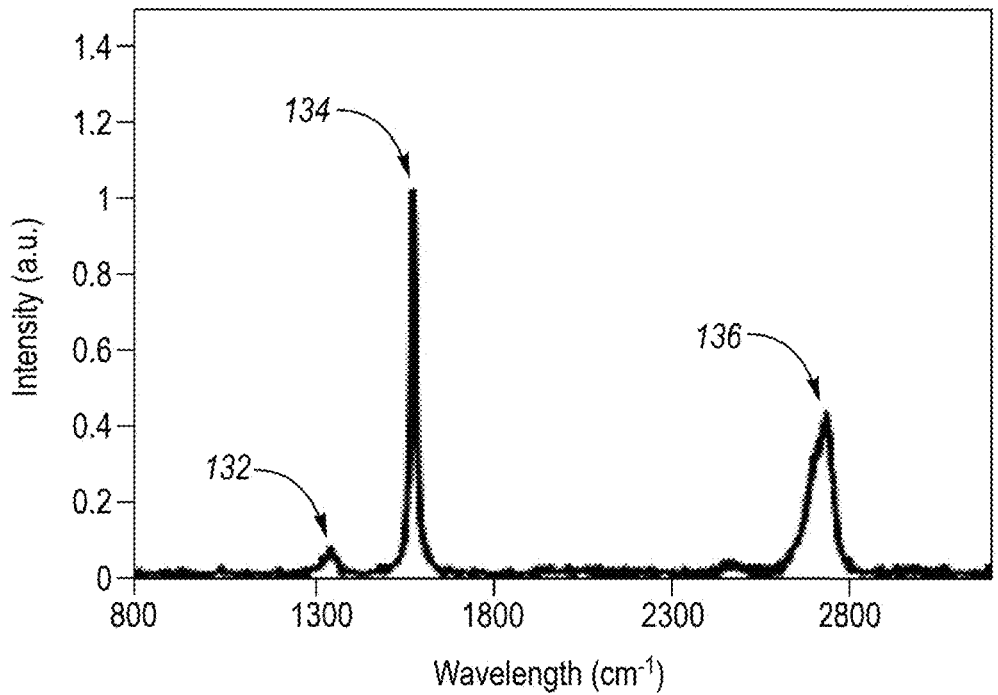
FIG. 7B depicts a Raman spectroscopy ($E_{laser}$=532 nm) of the exfoliated graphene from graphite (Gr 722) as described in FIG. 6B.

FIG. 7B depicts a Raman spectroscopy ($E_{laser}$=532 nm) 130 of the exfoliated graphene from graphite (Gr 722) as described in FIG. 6B. The Raman spectroscopy 130 can be used to investigate structural defects on the exfoliated graphene from Gr 722. An energy shift caused by laser excitation creates main Raman peak positions. For example, a D band 132 is typically shown at or around 1350 cm$^{-1}$; a G band 134 is typically shown at or around 1570 cm$^{-1}$; and a 2D band 136 is typically shown at or around 2700 cm$^{-1}$. The D band 132 is a defect-activated peak that corresponds to sp$^3$-defects or vacancy-type defects. The G band 134 may shift to a higher wavelength (1600 cm$^{-1}$) in the presence of oxygenated functional groups on the graphene structure. Referring to FIG. 7B, the Raman spectroscopy 130 appears to indicate that no oxygenated functional groups exits in the synthesized Gr 722, and that all defect-activated peaks may correspond to vacancy-type defects. The 2D band 136 may increase its intensity and broaden its shape with increasing exfoliation levels. Exposing natural graphite flakes to the strong Couette fluid flow created by the TCR results in structural changes in the graphite lattice, yielding a higher intensity of the D band 132. A ratio of the band intensity (I) of the D band to the G band, i.e. $I_{(D)}/I_{(G)}$, may be used to determine a defect level in a synthesized graphene. The $I_{(D)}/I_{(G)}$ ratio may increase as the reaction mixture is exposed to the high shear rate at extended shearing times in the TCR.

Figure 8:
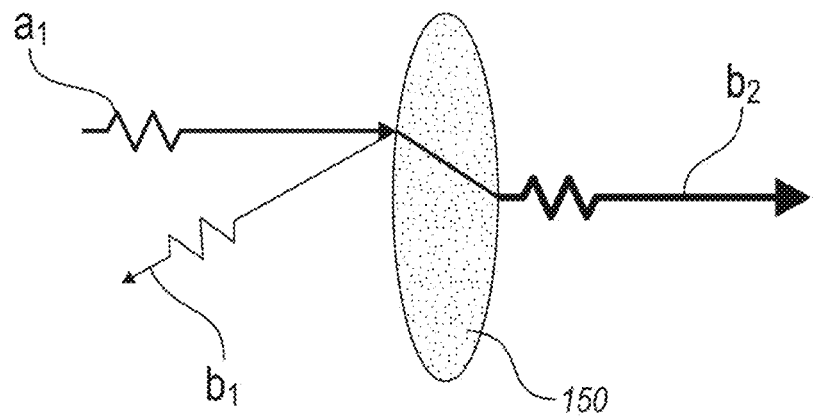
FIG. 8 depicts a schematic diagram illustrating the relationship between the absorbance and transmittance of a material.

FIG. 8 depicts a schematic diagram illustrating the relationship between the absorbance and transmittance of a material 150. The material 150 may be graphene and/or its derivatives prepared using the method illustrated in FIG. 2 or 3. In FIG. 8, an incident EM wave is represented by $a_1$. The amount of EM wave that is reflected by the material 150 is represented by $b_1$. As such, the reflectance (R) of the material 150 can be calculated as $R=b_1/a_1$. The amount of EM wave that passes through the material 150 is represented by $b_2$. As such, the transmittance (T) of the material 150 can be calculated as $T=b_2/a_1$. The absorbance (A) of the material 150 can be calculated as $A=-\log_{10} T$, i.e.

$$A = \log_{10}\left(\frac{a_1}{b_2}\right).$$

Figure 9:
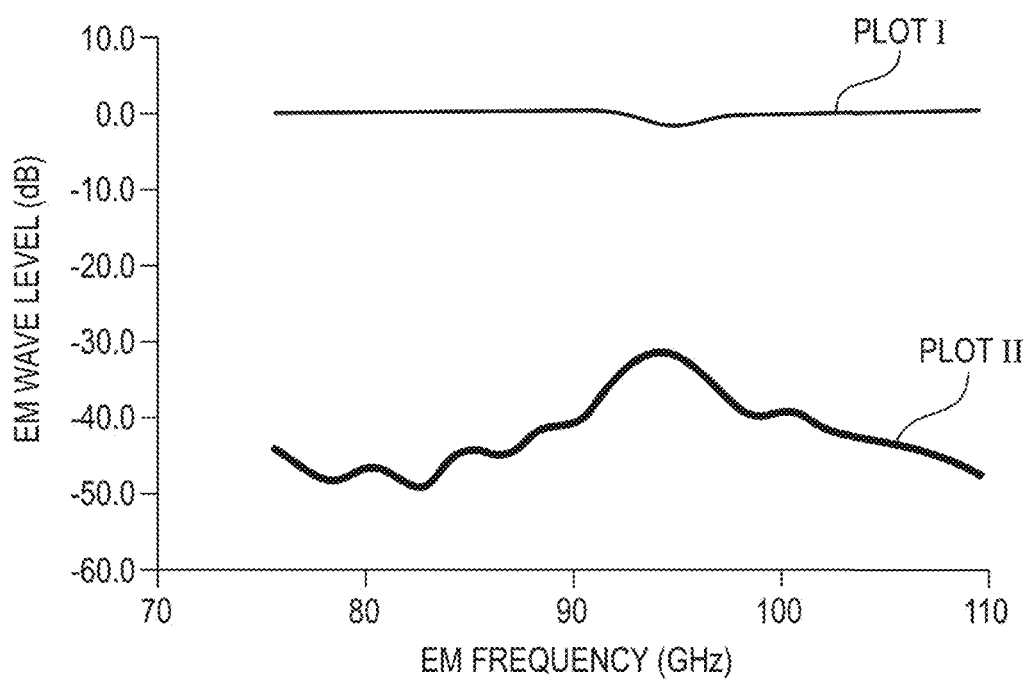
FIG. 9 depicts a schematic diagram showing an EM level as a function of an EM frequency of an EM wave directing to a substrate when graphene and/or graphene derivatives is deposited as a coating material onto the substrate.

FIG. 9 depicts a schematic diagram showing an EM wave level as a function of an EM wave frequency of an EM wave directing to a substrate when graphene and/or graphene derivatives is deposited as a coating material onto the substrate. The EM wave may be EMI emitted by an electronic device or an electronic component of the electronic device. The unit of the EM level is decibel (dB), and the unit of the EM frequency is gigahertz (GHz). The graphene and/or graphene derivatives may be prepared using the method illustrated in FIG. 2 or 3. The graphene and/or graphene derivatives may be graphene exfoliated from graphite Gr 3061 or Gr 722. The substrate may be a resin, including, but not limited to, PP, PBT, PPS, ABS, PA, or its composite. The composite of the resin may be reinforced with glass fiber or other resin filler materials. The resin filler materials may be, but not limited to, talcum powder (talc). The graphene and/or graphene derivatives may be deposited onto the substrate using the ACES process as illustrated in FIG. 5. In FIG. 9, Plot I represents the reflectance of the graphene and/or graphene derivatives, and Plot II represents the transmittance of the graphene and/or graphene derivatives. FIG. 9 suggests that when the graphene and/or graphene derivatives is deposited onto the substrate, the graphene and/or graphene derivatives may not reflect EM waves, and almost all of the EM waves may be absorbed by the graphene and/or graphene derivatives. Therefore, the application of the graphene and/or graphene derivatives on the substrate may effectively absorb EM waves that direct to the substrate.

Apart from protecting a substrate (e.g. a metal substrate of an electrical device) from EMI, the coating material deposited onto the substrate should also possess a good thermal conductivity to help dissipate heat from the substrate. As discussed in FIG. 2 or 3, graphene and/or graphene derivatives may be prepared using the TCR. Depending on the reaction time and/or a reaction temperature in the TCR, the extent of exfoliation of natural graphite flakes may vary, which may result in graphene and/or graphene derivatives having different thermal conductivity. Table 1 depicts thermal conductivity of graphene and/or graphene derivatives prepared using the TCR described in FIG. 2 or 3 in relation to a reaction time and/or a reaction temperature in the TCR. The thermal conductivity of graphene and/or graphene derivatives may be measured using a physical property measurement system (PPMS).

TABLE 1

Thermal conductivity of graphene and/or graphene derivatives in relation to a reaction time and/or a reaction temperature in the TCR.

| Reaction time (h) in the TCR | Reaction temperature (° C.) in the TCR | Thermal conductivity (W/K-m) |
|---|---|---|
| 1 | — | 49.3 |
| 2 | — | 530.5 |
| 3 | — | 638.1 |
| 1 | 600 | 409.6 |
| 2 | 600 | 1923.6 |
| 3 | 600 | 2023.5 |

As shown in Table 1, the thermal conductivity of the synthesized graphene and/or graphene derivatives appears to increase when the reaction time of the natural graphite flakes in the TCR increases. Additionally, the thermal conductivity of the synthesized graphene and/or graphene derivatives appears to increase when the reaction temperature in the TCR also increases. Therefore, by controlling the reaction time and the reaction temperature in the TCR may provide graphene and/or graphene derivatives with different thermal conductivity as needed.

Figure 10:
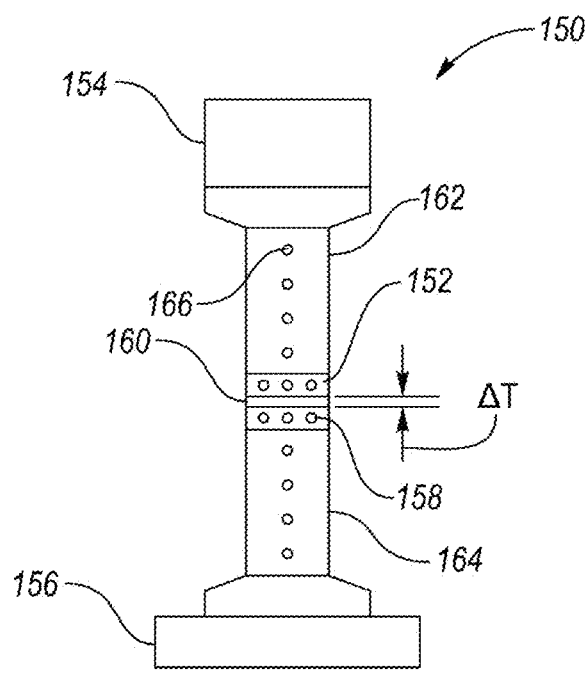
FIG. 10 depicts a schematic diagram of a setup used to measure a thermal conductivity of a substrate.

FIG. 10 depicts a schematic diagram of a setup 150 used to measure a thermal conductivity of a substrate. The substrate may be a Cu substrate. As shown in FIG. 10, a first Cu substrate 152 may be placed between a heat source 154 and a cooling source 156 (e.g. a heat sink) of the setup 150, and a second Cu substrate 158 may be placed between the first Cu substrate 152 and the cooling source 156. A grease layer 160 may be disposed between the first and second Cu substrates 152 and 158. The setup 150 may further include a first standard rod 162 connecting the heating source 154 and the first Cu substrate 152 in series. The setup 150 may also include a second standard rod 164 connecting the second Cu substrate 158 and the cooling source 156 in series. The setup 150 may further include several measuring points 166 on the first and second standard rods 162 and 164 and the first and second Cu substrates 152 and 158 for measuring the thermal conductivity of the first and second. Cu substrates 152 and 158. Changing the thickness of the grease layer 160 (ΔT) may affect the thermal conductivity of the Cu substrates.

Figure 11:
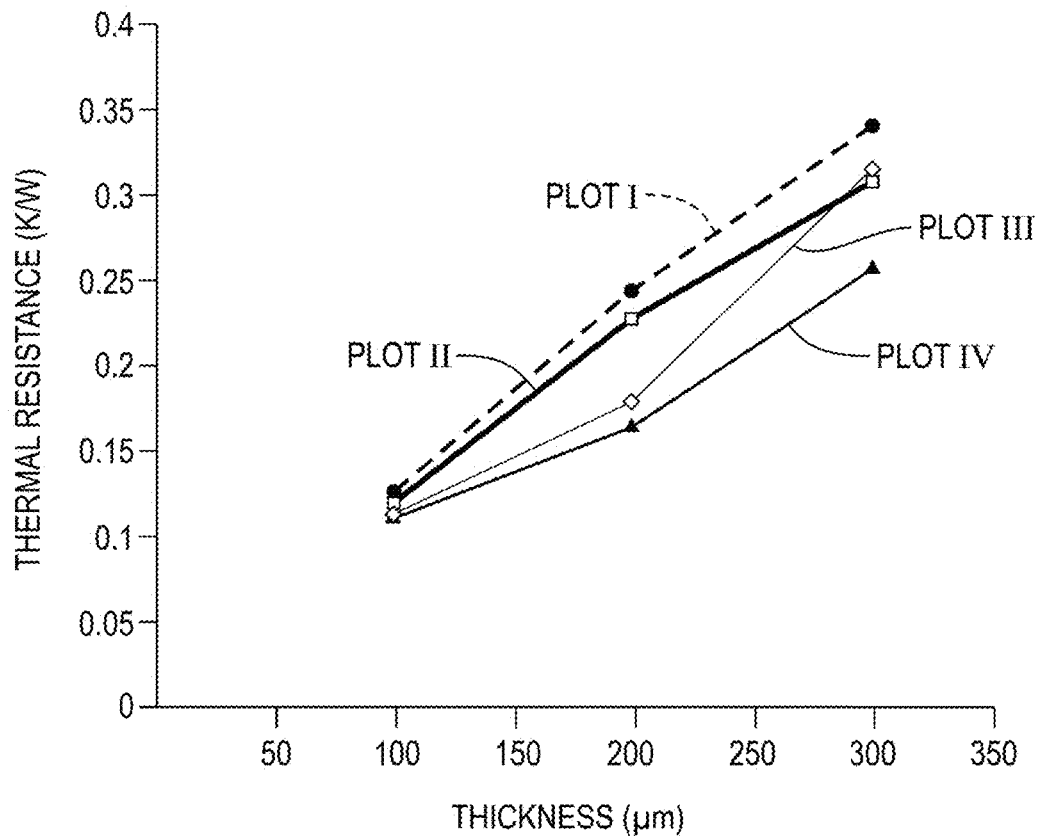
FIG. 11 depicts a schematic diagram showing a thermal resistance of a substrate as a function of a thickness of a grease layer between the substrates.

FIG. 11 depicts a schematic diagram showing a thermal resistance of a substrate as a function of a thickness of a grease layer between the substrates. The substrate may be Cu substrates as described in FIG. 10. The grease layer may be positioned between the Cu substrates. In FIG. 11, Plots I and II represent two baseline measurements of the thermal resistance of the Cu substrates when no coating materials are deposited onto the Cu substrates. Plot III represents a scenario where a thin layer of coating material is formed on the Cu substrates. The coating material may be graphene and/or graphene derivatives. The graphene and/or graphene derivatives may be prepared using the method described in FIG. 2 or 3. The coating material may be deposited onto the Cu substrates using the ACES process as illustrated in FIG. 5. The coating material may have a thicknesses of 10 μm. The Cu substrates of Plot III exhibit a lower thermal resistance compared to those of Plot I or II, indicating that the thin layer of coating material formed on the Cu substrates may increase the thermal conductivity of the Cu substrates and thus promote heat dissipation.

Continuing referring to FIG. 11, Plot IV represents a scenario where another thin layer of coating material is formed on the Cu substrates. The coating material may be graphene and/or graphene derivatives. The graphene and/or graphene derivatives may be prepared using the method described in FIG. 2 or 3. The coating material may be deposited onto the Cu substrates using the ACES process as illustrated in FIG. 5. The coating material may have a thicknesses of 1 μm. The Cu substrates of Plot IV exhibit a lower thermal resistance compared to those of Plot I or II, indicating that the thin layer of coating material formed on the Cu substrates may increase the thermal conductivity of the Cu substrates and thus promote heat dissipation. Furthermore, FIG. 11 also suggests that a relatively thinner layer of the coating material formed on the Cu substrates may better help with heat dissipation for the Cu substrates.

Figure 12:
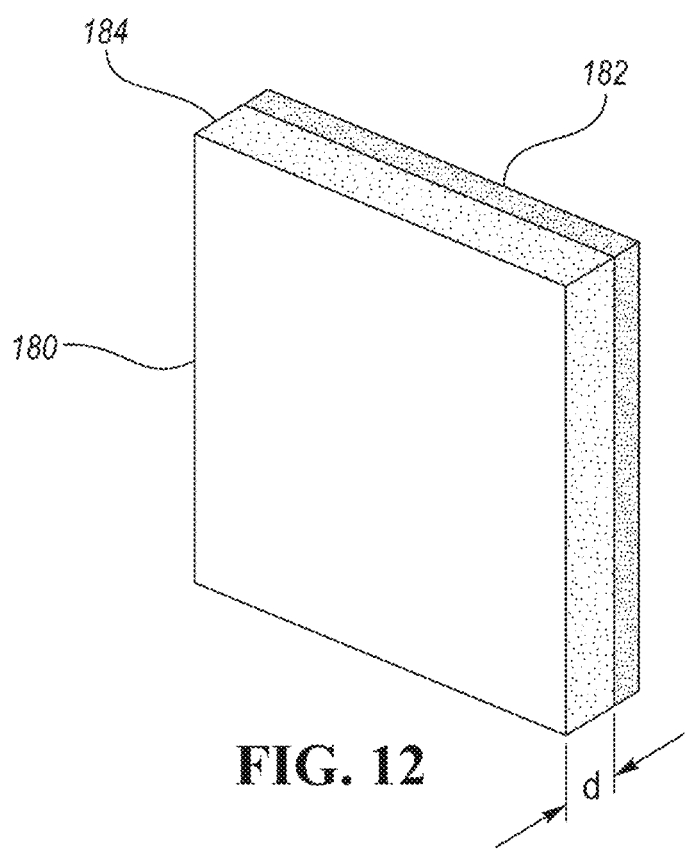
FIG. 12 depicts a schematic diagram showing a metal substrate leaving a coating layer.

FIG. 12 depicts a schematic diagram showing a metal substrate 182 having a coating layer 180. The coating layer 180 may be an electric resistant film. The coating layer 180 may include a coating material. The coating material may be graphene and/or graphene derivatives. The graphene and/or graphene derivatives may be prepared using the method described in FIG. 2 or 3. The graphene and/or graphene derivatives may be graphene exfoliated from graphite Gr 3061 or Gr 722. The coating layer may have a thickness in a range of 0.1 to 200 μm. The metal substrate 182 may be a metal substrate of an electronic device (e.g. electrical circuits or the like). In some embodiments, the metal substrate 182 is an EMI shield of the electronic device, where the EMI shield may be a metal sheet or metal screen.

As shown in FIG. 12, a spacer 184 may be attached to the metal substrate 182. The spacer 184 may be a dielectric layer. The spacer 184 may include a spacer material. In some embodiments, the spacer material may be a resin, including, but not limited to, PP, PBT, PPS, ABS, PA, or its composite. The composite of the resin may be reinforced with glass fiber or other resin filler materials. The resin filler materials may be, but not limited to, talcum powder (talc). In some other embodiments, the spacer material may be a metal. In yet some other embodiments, the spacer material may be a ceramic. In still yet some other embodiments, the spacer material may be a silicone substrate. In further yet some other embodiments, the spacer material may be a hybrid of a resin, a metal, a ceramic, or a silicone substrate. The coating layer 180 may be deposited onto a surface of the spacer 184 using the ACES process as illustrated in FIG. 5, where the surface faces away from the metal substrate 182. A thickness (d) of the spacer 184 may vary depending on a wavelength (λ) of an EM wave to be absorbed by the coating layer 180. In some embodiments, d equals λ/4. The coating layer 180 formed on the metal substrate 182 may absorb EM waves with different frequencies. In some embodiments, the coating layer 180 may absorb EM waves with frequencies below 20 GHz. In some other embodiments, the coating layer 180 may absorb EM waves with frequencies in high frequency regions, such as above 20 GHz. For example, the coating layer 180 may absorb EM waves with a frequency of 77 GHz. In addition to absorb EM waves, the coating layer 180 may also promote heat dissipation of the metal substrate 182.

Figure 13:
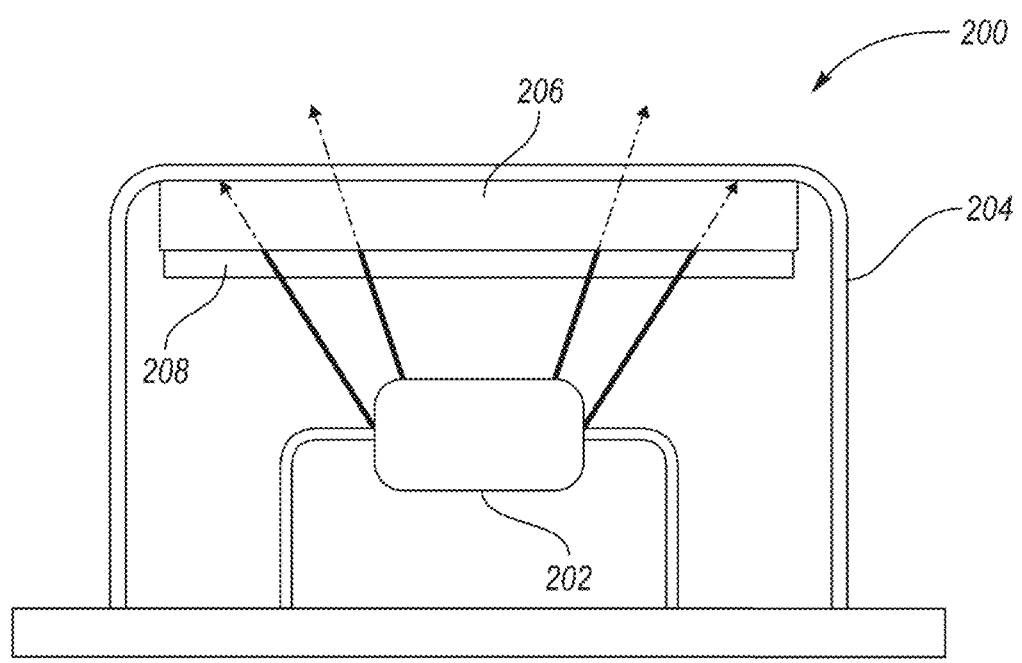
FIG. 13 depicts a schematic diagram of an electronic device.

FIG. 13 depicts a schematic diagram of an electronic device 200. The electronic device 200 may include an electronic component 202 which can emit electromagnetic conduction or radiation (e.g. EM waves). The emitted electromagnetic conduction or radiation is generally referred to as EMI. EMI can disturb a normal function of an affected electrical circuit, thereby degrading or limiting the performance of the electrical circuit. To diminish the effect of EMI, a metal substrate 204, such as a shield, may be used to cover the electronic component 202. On one hand, the metal substrate 204 may shield electromagnetic conduction or radiation generated by the EMI source from affecting other devices (e.g. electrical circuits or the like). On the other hand, the metal substrate 204 may protect the covered electronic component 202 from electromagnetic conduction or radiation emitted from those other devices. The metal substrate 204 may be generally made of an electrically conductive material, which may be a metal sheet or metal screen. The metal substrate 204 may be electrically coupled (e.g. soldered or the like) to the electronic device 200.

Referring to FIG. 13, the electronic device 200 may include a spacer 206 attached to the metal substrate 204. In some embodiments, the spacer 206 may be attached to an inner surface of the metal substrate 204. In some other embodiments, the spacer 206 may be attached to an outer surface of the metal substrate 204. The spacer 206 may be a dielectric layer. The spacer 206 may include a spacer material. In some embodiments, the spacer material may be a resin, including, but not limited to, PP, PBT, PPS, ABS, PA, or its composite. The composite of the resin may be reinforced with glass fiber or other resin filler materials. The resin filler materials may be, but not limited to, talcum powder (talc). In some other embodiments, the spacer material may be a metal. In yet some other embodiments, the spacer material may be a ceramic. In still yet some other embodiments, the spacer material may be a silicone substrate. In further yet some other embodiments, the spacer material may be a hybrid of a resin, a metal, a ceramic, or a silicone substrate. To enhance EMI shielding, a coating layer 208 may be deposited onto a surface of the spacer 206, where the surface faces away from the metal substrate 204. The coating layer 208 may be an electric resistant film. The coating layer 208 may include a coating material. The coating material may be graphene and/or graphene derivatives. The graphene and/or graphene derivatives may be prepared using the method described in FIG. 2 or 3. The graphene and/or graphene derivatives may be graphene exfoliated from graphite Gr 3061 or Gr 722. The coating layer 208 may have a thickness in a range of 0.1 to 200 μm. The coating layer 208 may be deposited onto the spacer 206 using the ACES process as illustrated in FIG. 5. A thickness (d) of the spacer may vary depending on a wavelength (λ) of an EM wave to be absorbed by the metal substrate 204. In some embodiments, d equals λ/4. The coating layer 208 formed on the metal substrate 204 may absorb EM waves with different frequencies. In some embodiments, the coating layer 208 may absorb EM waves with frequencies below 20 GHz. In some other embodiments, the coating layer 208 may absorb EM waves in high frequency regions, such as above 20 GHz. For example, the coating layer 208 may absorb EM waves with a frequency of 77 GHz. In addition to absorb EM waves, the coating layer 208 may also promote heat dissipation of the electronic component 202.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A coating layer for a substrate, the coating layer comprising:
   a coating material having graphene and/or graphene derivatives that reflect and/or absorb an electromagnetic (EM) wave having a frequency of above 20 GHz, wherein the coating material is deposited on a surface of the substrate; and
   wherein the substrate has a thickness of ¼ of a wavelength of the EM wave.

2. The coating layer of claim 1, wherein the substrate is a resin.

3. The coating layer of claim 2, wherein the resin is polypropene (PP), polybutylene terephthalate (PBT), polyphenylene sulfide (PBS), acrylonitrile butadiene styrene (ABS), polyamindes (PA), or its composite.

4. The coating layer of claim 1, wherein the substrate is a metal, a ceramic, a silicon substrate, or a hybrid thereof.

5. The coating layer of claim 1, wherein the coating layer has a thickness in a range of 0.1 to 200 μm.

6. The coating layer of claim 1, wherein the coating material is prepared by a Taylor-Couette reactor (TCR).

7. An electronic device comprising:
   an electronic component emitting an electromagnetic (EM) wave with a frequency of above 20 GHz;
   a metal substrate electrically coupled to the electronic device and covering the electronic component;
   a spacer having a spacer material attached to the metal substrate; and
   a coating layer having a coating material deposited on a surface of the spacer that faces away from the metal substrate, wherein the coating material is graphene and/or graphene derivatives that reflect and/or absorb the EM wave emitted by the electronic component, and wherein the coating material is prepared by a Taylor-Couette reactor (TCR).

8. The electronic device of claim 7, wherein the spacer material is a resin.

9. The electronic device of claim 8, wherein the resin is PP, PBT, PBS, ABS, PA, or its composite.

10. The electronic device of claim 7, wherein the spacer material is a metal, a ceramic, a silicon substrate, or a hybrid thereof.

11. The electronic device of claim 7, wherein the coating layer has a thickness in a range of 0.1 to 200 μm.

12. The electronic device of claim 7, wherein the spacer has a thickness of ¼ of a wavelength of the EM wave.

13. A method of preparing graphene and/or graphene derivatives as a coating material for a substrate, the method comprising:
   suspending graphite flakes in deionized water to give a first reaction mixture and stirring the first reaction mixture;
   adding a stabilizer to the first reaction mixture to give a second reaction mixture and stirring the second reaction mixture;

adding a dispersant to the second reaction mixture to give a third reaction mixture and stirring the third reaction mixture;

adding the third reaction mixture to a Taylor-Couette reactor (TCR) for reaction which gives a fourth reaction mixture, the TCR having a stationary inner cylinder and a rotary outer cylinder;

centrifuging the fourth reaction mixture; and collecting centrifugate from the fourth reaction mixture which contains exfoliated graphene.

14. The method of claim 13, further comprising adding an intercalant material to the third reaction mixture.

15. The method of claim 14, wherein the intercalant material is a metal or metal precursor element.

16. The method of claim 13, further comprising adding a binder to the third reaction mixture.

17. The method of claim 16, wherein the binder is polyacrylic acid (PAA), polyvinyl alcohol (PVA) or polyvinylpyrrolidone (PVP).

18. The method of claim 13, further comprising depositing the exfoliated graphene onto the substrate using air-controlled electrospray (ACES).

19. The method of claim 18, wherein the substrate is a resin, a metal, a ceramic, a silicon substrate, or a hybrid thereof.

20. The method of claim 18, wherein the exfoliated graphene deposited onto the substrate has a thickness of 0.1 to 200 μm.

* * * * *